(12) United States Patent
Dannoux

(10) Patent No.: US 7,141,433 B2
(45) Date of Patent: Nov. 28, 2006

(54) DEVICE AND PROCESS FOR SIMULTANEOUS TRANSFER OF LIQUIDS

(75) Inventor: Thierry L. A. Dannoux, Avon (FR)

(73) Assignee: Corning Incorporated, Corning, NY (US)

(*) Notice: Subject to any disclaimer, the term of this patent is extended or adjusted under 35 U.S.C. 154(b) by 644 days.

(21) Appl. No.: 10/163,216

(22) Filed: Jun. 4, 2002

(65) Prior Publication Data
US 2003/0124734 A1    Jul. 3, 2003

(30) Foreign Application Priority Data
Dec. 31, 2001 (EP) .................................. 01403394

(51) Int. Cl.
*B01L 3/02* (2006.01)
*G01N 1/10* (2006.01)

(52) U.S. Cl. .................. 436/180; 436/54; 422/100; 422/63

(58) Field of Classification Search ............... 422/100, 422/63; 436/180, 54
See application file for complete search history.

(56) References Cited

U.S. PATENT DOCUMENTS

| | | | | |
|---|---|---|---|---|
| 3,767,364 A | * | 10/1973 | Ritchie et al. ................ 422/50 |
| 4,621,665 A | * | 11/1986 | Webb ............................. 141/1 |
| 5,370,842 A | * | 12/1994 | Miyazaki et al. ........ 422/82.06 |
| 6,231,739 B1 | * | 5/2001 | Nordman et al. ........... 204/601 |
| 6,331,441 B1 | | 12/2001 | Balch et al. ................. 436/518 |
| 6,350,618 B1 | * | 2/2002 | Borrelli et al. ............. 436/174 |
| 6,387,236 B1 | * | 5/2002 | Nordman et al. ........... 204/601 |
| 6,387,330 B1 | * | 5/2002 | Bova et al. .................. 422/100 |
| 6,488,895 B1 | * | 12/2002 | Kennedy ..................... 422/100 |
| 6,592,825 B1 | * | 7/2003 | Pelc et al. ................... 422/100 |
| 6,596,237 B1 | * | 7/2003 | Borrelli et al. ............. 422/100 |
| 6,605,475 B1 | * | 8/2003 | Taylor et al. ................ 436/180 |
| 6,762,061 B1 | * | 7/2004 | Borrelli et al. ............. 436/180 |
| 6,783,732 B1 | * | 8/2004 | Madden et al. ............... 422/63 |
| 6,805,840 B1 | * | 10/2004 | Tajima ....................... 422/100 |
| 6,855,538 B1 | * | 2/2005 | Pinkel et al. ............. 435/287.2 |
| 6,866,825 B1 | * | 3/2005 | Chiou et al. ................ 422/100 |
| 6,884,626 B1 | * | 4/2005 | Borrelli et al. ............. 436/180 |
| 6,923,939 B1 | * | 8/2005 | Nayar et al. ................ 422/104 |
| 2002/0006359 A1 | * | 1/2002 | Mathies et al. ............. 422/100 |
| 2002/0025582 A1 | * | 2/2002 | Hubbard et al. ............ 436/180 |
| 2002/0028160 A1 | * | 3/2002 | Xiao et al. .................. 422/100 |
| 2002/0185377 A1 | * | 12/2002 | Sundberg et al. ........... 204/453 |
| 2003/0026737 A1 | * | 2/2003 | Inoue .......................... 422/100 |
| 2003/0032198 A1 | * | 2/2003 | Lugmair et al. ............ 436/180 |
| 2003/0049177 A1 | * | 3/2003 | Smith et al. ................. 422/100 |
| 2003/0108451 A1 | * | 6/2003 | Su et al. ..................... 422/100 |
| 2003/0124736 A1 | * | 7/2003 | Manz et al. ................. 436/180 |
| 2003/0198575 A1 | * | 10/2003 | Noda et al. ................. 422/100 |
| 2003/0228241 A1 | * | 12/2003 | Legge ......................... 422/100 |
| 2004/0033168 A1 | * | 2/2004 | Hughes et al. .............. 422/100 |
| 2004/0047765 A1 | * | 3/2004 | Gordon et al. ................ 422/63 |
| 2004/0203174 A1 | * | 10/2004 | Jones et al. ................. 436/180 |

FOREIGN PATENT DOCUMENTS

| | | |
|---|---|---|
| DE | 19712195 | 9/1998 |
| EP | 0 955 084 | 11/1999 |
| GB | 2 353 093 | 2/2001 |
| WO | WO 99/55460 | 11/1999 |

* cited by examiner

*Primary Examiner*—Brian R. Gordon
(74) *Attorney, Agent, or Firm*—Thomas R. Beall; Melissa K. Dobson

(57) ABSTRACT

Devices and processes for the simultaneous transfer of liquids from a source container to a target container are disclosed. The source container includes a multitude of source sub-containers, and the target container includes a multitude of target sub-containers. The device includes a multitude of tubes arranged in a matrix, each tube having an entrance and exit.

7 Claims, 4 Drawing Sheets

FIG. 1
FIG. 2
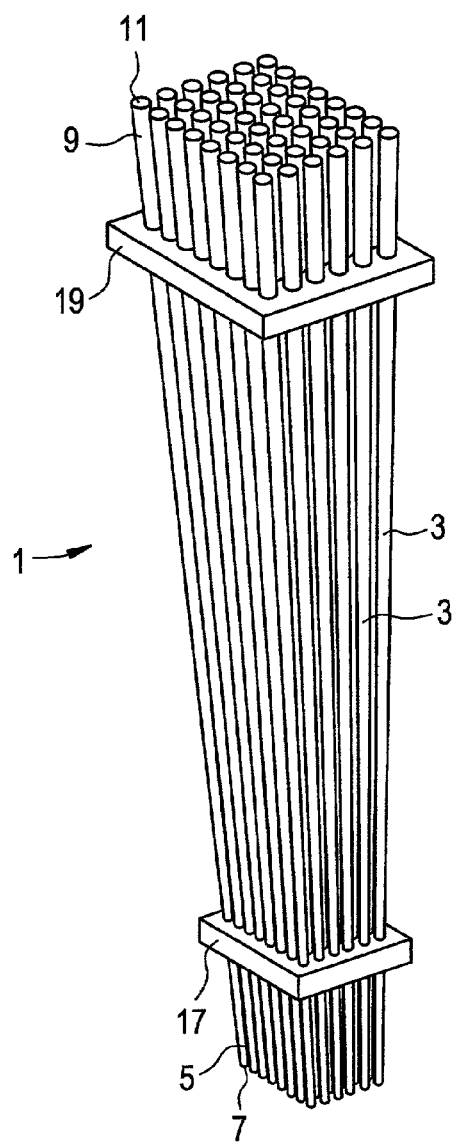
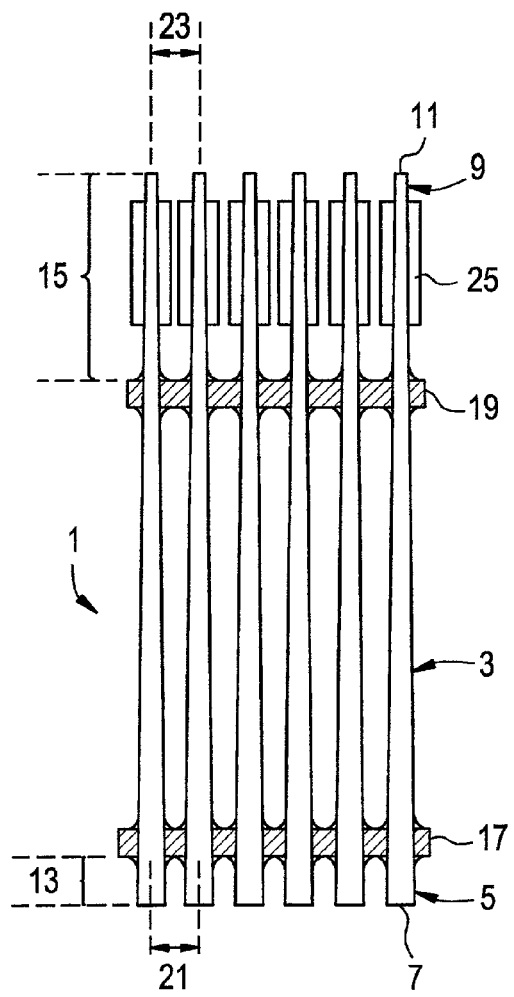

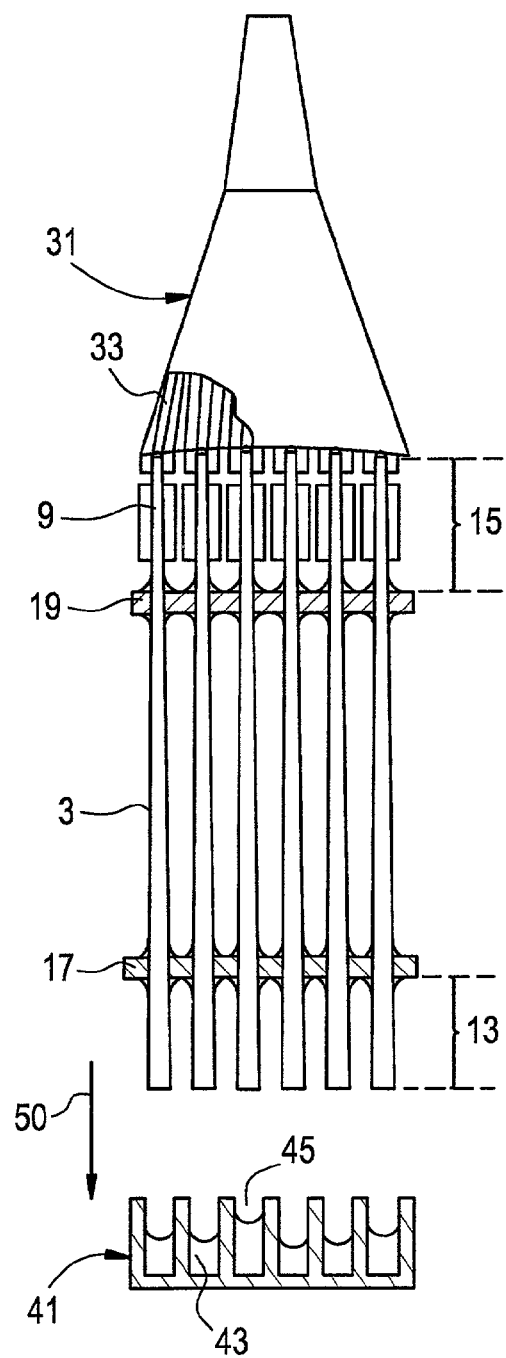
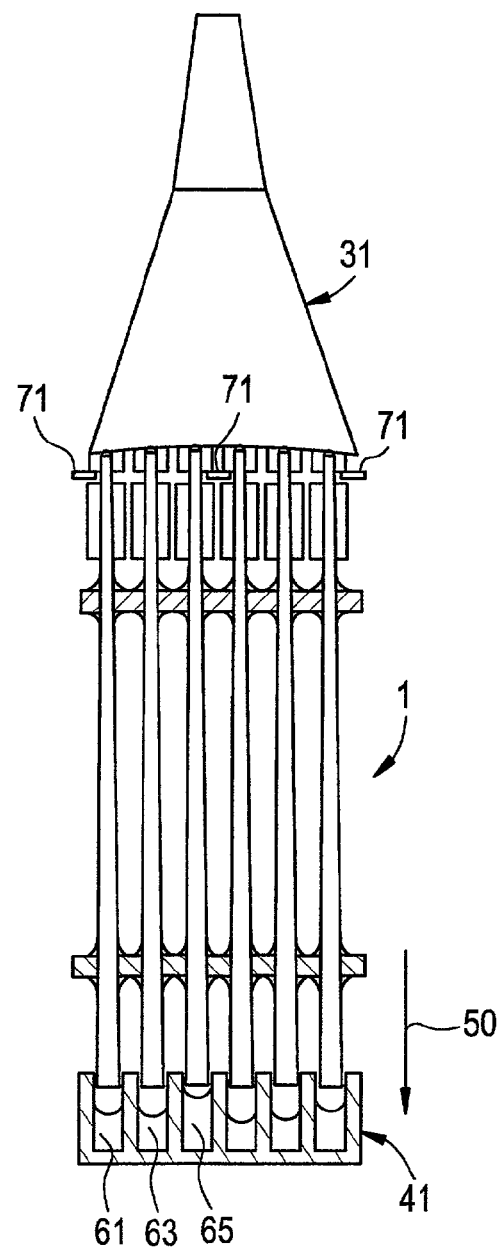

US 7,141,433 B2

DEVICE AND PROCESS FOR SIMULTANEOUS TRANSFER OF LIQUIDS

RELATED APPLICATIONS

This Application claims the benefit of French Patent Application No. 01 403 394.8, filed on Dec. 31, 2001, in the name of Thierry L. A. Dannoux, the entire content of which is incorporated herein by reference.

FIELD OF THE INVENTION

This invention pertains to the technical area of the transfer of liquids from a source container to a target container. In particular, the invention relates to a device and a process for transfer of liquids from a source container to a target container.

BACKGROUND

When different liquids contained in source sub-containers are transferred to target sub-containers, there is a risk of contamination of some liquids with other liquids. One solution that has been used in the past to prevent such contamination consists of filling the target sub-containers manually one at a time, for example by using pipettes or syringes which have been filled in the sub-containers.

However, the disadvantage of this manual filling method is that it is time-consuming, particularly in the presence of a large number of sub-containers. Typically, the filling time for a capillary reservoir (target container) with 1000–5000 canals (target sub-containers) is on the order of 40 to 120 hours. Therefore, it is difficult to imagine industrial application of a manual filling method of this kind.

Manual filling also presents other related disadvantages. Liquid contamination may occur if the operator fills the wrong target sub-container, and then the filling operation must be re-started.

Another disadvantage resulting from manual filling is connected to the particular knack or individual technique developed by each operator in performing the filling operation, and this affects the reproducibility as well as the reliability of the operation. In fact, introduction of the liquid into each target sub-container should be such that there is no formation of inserted air bubbles that might later affect the behavior of the transferred liquid, particularly in the transfer of small volumes of liquids, such as 30 microliters.

Proposals have been made to automate the manual filling of the target sub-containers by using a programmable robot that can fill a pipette or a syringe with an appropriate liquid, bring it to the opening of each sub-container, and transfer the liquid into said sub-container, then repeat these operations for all the sub-containers. Automation of this kind improves the reliability and reproducibility of the transfer, but does not solve the problem of transfer time.

An inherent disadvantage in the filling, including automated filling, of target sub-containers, one after the other, is related to the fact that some liquids that would be transferred have properties that change over time. This is true, for example, in the case of biological products. The concentration may change because of evaporation when the quantities of transferred liquids are very small, for example, less than 10 microliters. When the time required to fill the sub-containers of the target container is substantial, variations may be encountered in the properties between the liquids which have been transferred at the beginning of the filling operation and the liquids which are transferred several hours later. If these liquids are used to perform biological tests, the results of these tests may be biased or even erroneous.

This invention seeks to overcome the disadvantages described above. Certain embodiments provide a device for simultaneous transfer of liquids, particularly different liquids, from a source container to a target container, said transfer being rapid, reproducible, reliable, and capable of automation. Other embodiments of this invention provide a process for simultaneous transfer.

SUMMARY

Certain embodiments of the invention pertain devices and methods for the transfer of liquids from a source container to a target container. The device and the process of the invention are particularly well suited to simultaneous transfer of liquids from a source container comprising a multitude of source sub-containers to a target container comprising a multitude of target sub-containers.

For purposes of this invention, "a multitude" of sub-containers is defined as a set of sub-containers comprising at least 2 sub-containers.

The transferred liquids may be identical to each other, or they may be different.

The device and the process of the invention have applications in a number of areas, particularly in simultaneous transfer of biological liquids from a source container such as a microtitration plate to a target container, e.g. another microtitration plate of a different size, or a capillary reservoir with multiple canals for printing microscope slides. They are particularly well suited for the simultaneous transfer of small volumes of liquids, typically less than 30 microliters, more specifically less than 20 microliters, and particularly less than 12 microliters.

According to one embodiment of the invention, a device for simultaneous transfer of liquids from a source container including a multitude of source sub-containers to a target container including a multitude of target sub-containers is provided. In this embodiment, the device includes a multitude of tubes arranges in a matrix, each tube having an entry opening at an entry end and an exit opening at an exit end; at least one means of alignment to maintain pre-determined distances between the entry ends of the tubes and to maintain pre-determined distances between the exit openings of the tubes, wherein each of the tubes is capable of retaining liquid by a phenomenon of capillarity.

In embodiments in which the tubes are rigid, it is advantageous to provide a device including two means of alignment. One means maintain the pre-determined distances between the entry ends, and the other means maintains the pre-determined distances between the exit ends.

In some embodiments, the device is equipped with at least one means of guiding the entry ends of the tubes into the source sub-containers, and/or at least one means of guiding the exit ends of the tubes into the target sub-containers.

According to another embodiment of the invention, a process for the simultaneous transfer of liquids from a source container comprising a multitude of source sub-containers into a target container comprising a multitude of target sub-containers is provided. The method includes providing a device of the type described above and introducing the exit ends of the tubes are into the target sub-containers, introducing the entry ends of the tubes are in an essentially vertical direction into the source sub-containers and including the device, the source container, and the target container is to an angle greater than about 90°. Additional advantages of the invention will be set forth in the following detailed description. It is to be understood that both the foregoing general description and the following detailed description are exemplary and are intended to provide further explanation of the invention as claimed.

BRIEF DESCRIPTION OF THE DRAWINGS

The device and the process of the invention will be described below in the detailed description by a non-limiting example of preferred embodiment, illustrated by the attached drawings, in which:

FIG. 1 illustrates a perspective view of one embodiment of the device of the invention;

FIG. 2 illustrates a device according to one embodiment of the invention in a longitudinal section, equipped with a guiding means adapted to the use of the invention for filling a capillary reservoir;

FIGS. 5, 6, and 7 illustrate, respectively, 3 stages of one embodiment of the process of the invention;

DETAILED DESCRIPTION

Figure 3:
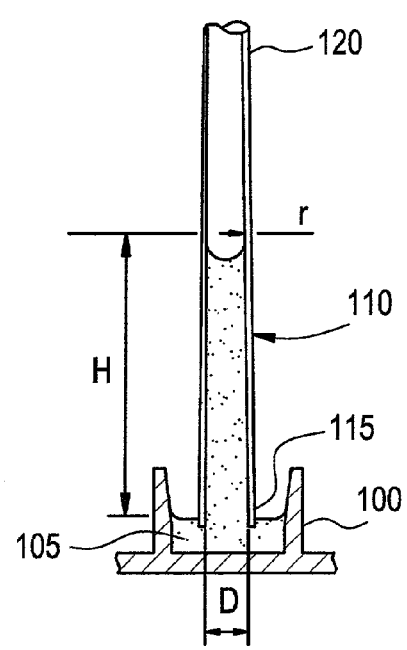
FIG. 3 is a schematic illustration of the phenomenon of capillarity.

Before describing several exemplary embodiments of the invention, it is to be understood that the invention is not limited to the details of construction or process steps set forth in the following description. The invention is capable of other embodiments and of being practiced or carried out in various ways. One embodiment of the device 1 is represented in longitudinal section in FIG. 2 and includes a multitude of tubes 3, each having an entry end 5 terminating at an entry opening 7, and an exit end 9 terminating at a exit opening 11.

Still referring to FIG. 2, the tubes 3 can be made of a material made of plastic, such as polypropylene, or metal such as stainless steel, for example by processes of extrusion or drawing. Preferably, a surface treatment is applied to the external surface of the tubes 3, so that they will not absorb the liquids to be transferred.

It is preferable for the device 1 to be made of a material that is easy to clean so that the device 1 can be re-used without the risk of contaminating the transferred liquids. Cleaning may be accomplished with a solvent, or by pyrolysis for metals, with the pyrolysis temperature adjusted so that it does not damage the surface treatment, if necessary.

FIG. 3 shows a schematic illustration, in longitudinal section of the phenomenon of capillarity, by means of a container 100 holding a liquid 105 and a tube 110 having a first end 115 and a second end 120. When the first end 115 is introduced into the container 100, the liquid 105 is automatically aspirated into the tube 110, to a height H, defined by the following equation:

$$H = 2\gamma/\rho g r,$$

in which $\gamma$ is the surface tension of the liquid, $\rho$ is the density of the liquid, g is the acceleration by gravity, and r is the radius of curvature of the capillary section. This phenomenon can occur only when the tube, still called capillary, has a relatively small diameter D, typically less than 2 mm.

A preferred embodiment of the device 1 includes conical tubes 3, which have an entry opening 7 larger than the exit opening 11, and a transverse section which decrease from the entry opening 7 to the exit opening 11. The dimensions of the transverse section and the length of the tubes 3 are adapted to the desired applications, particularly to the dimensions of the source sub-containers and the target sub-containers. Examples of dimensions will be presented below.

It is also preferable for the tubes 3 to have a circular transverse section, as they will be easier to manufacture. The tubes 3 are assembled together to form a matrix structure by at least one means of assembly or alignment member 17, 19 which leaves free the entry openings 7, the exit openings 11, and a useful part of the end 13, 15 to said openings 7, 11. The means of assembly or alignment members 17, 19 also function to maintain pre-determined distances between the entry openings 7 of the tubes 3 and the exit openings 11 of the tubes 3.

According to a preferred embodiment of the invention, illustrated in the figures, the device 1 comprises a first means of assembly or alignment member 17 placed toward the entry ends 5, which maintains a pre-determined distance 21 between the entry ends and/or openings 7, and a second means of assembly or alignment member 19 placed toward the exit ends 9, which maintains a predetermined distance 23 between the exit ends and/or openings 11. The distances 21, 23 are defined as the distances, which separate the 2 longitudinal axes of the 2 neighboring tubes 3. In other embodiments, it may be desirable to provide for one or more intermediate means of assembly (not shown) or alignment member to be placed between the first and second means of assembly or alignment members 17, 19. Alternatively, it may be desirable to provide a single means of assembly or alignment member to extent over the entire length of the tubes 3 between the 2 useful portions 13, 15. The alignment members 17, 19 may include a plurality or ridges, channels, openings or other suitable means for spacing and aligning the tubes.

The tubes 3 may be rigid or flexible. When the tubes 3 are rigid and/or when there is a single means of assembly or alignment, the whole of device 1 forms an essentially rigid matrix structure. According to the embodiments illustrated in the figures, the matrix structure is linear, i.e., it is made of up perpendicular rows of tubes 3.

The means of assembly or alignment members 17, 19 are made up of any means capable of creating a rigid assembly, such as a perforated plate with the dimensions of the perforations corresponding to the dimensions of the tubes 3 on the segment for attachment of the tubes 3, and the distances between the perforations corresponding to the desired distances between the tubes 3. The means of assembly or alignment members 17, 19 are attached to each tube 3 by gluing, or by laser welding, or by hard-soldering as illustrated in the figures, or by any other attachment procedure that is compatible with the material making up the tubes 3 and with any surface treatment of the external surface of the tubes 3. Forced fitting can also be used for attachment to a conical portion of tube 3.

The device 1 may advantageously include at least one guide 25 to guide the entry ends 5 and the exit ends 9 during the stage of the process consisting of introducing said entry ends 5 and exit ends into the source sub-containers 43 and the target sub-containers 33. FIG. 2 illustrates a device 1 according to the invention, equipped with a guide means 25 at its exit end 9. This guide 25 can be used to guide the exit ends 9 of the tubes 3 when they are introduced into the target sub-containers 33. Advantageously, it takes the form of a multitude of sleeves which surround, support, and guide said ends 9.

Figure 4:
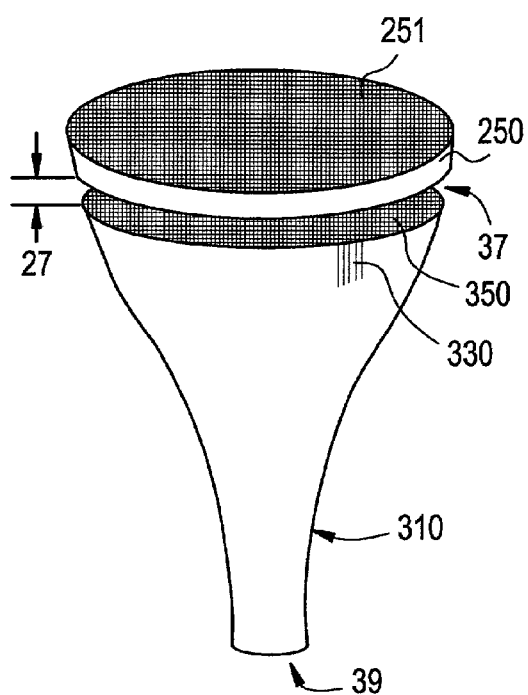
FIG. 4 illustrates creation of the guiding means of FIG. 2.

In the example illustrated in FIG. 1, and in FIGS. 5–8 illustrating a process according to one embodiment of the invention, the guide 25 is specially adapted to the target container 31, which consists of a capillary reservoir. Such a capillary reservoir, referenced 310, is represented in FIG. 4. It includes an entry face 37, an exit face 39, and crossing canals 330 which extend from the entry face 37 to the exit face 39, and which emerge onto the entry face 37 by the entry opening 350.

A reservoir such as 310 has been described in the international patent application WO 99/55460, corresponding to U.S. Pat. No. 6,350,618, the entire contents of which is incorporated herein by reference. It is made by operations of extrusion, sintering, and drawing of a mixture of glass powder and a polymer binder. The extrusion phase creates identical and parallel canals 330; the number of these canals may be up to several hundred or several thousand. Said canals 330, after the drawing stage, present the characteristic of having dimensions which decrease between large entry openings 350 of an entry face 37 and small exit openings of an exit face 39.

When in service, the canals 330 of the reservoir 310 must be filled with liquids, which are, for the desired application, different biological components, and they generally originate from microtitration plates. The liquids flow through the canals 330 by the phenomenon of capillarity, and reach the exit openings of the exit face 39. The reservoir 310, which is filled in this way, can print, by its exit face 39, hundreds or thousands of different biological molecules onto a microscope slide. It is clear that simultaneous filling of at least part of the canals of the reservoir is desirable.

In general, the liquids transferred, although different from each other, are preferably quite similar in nature, and the parameters γ (surface tension of the liquid) and ρ (density of the liquid) characteristic of each liquid are of the same order of magnitude. Consequently, the law of capillarity applies in essentially the same way for the dimensions of the tubes 3 considered. For the same reason, treatment of the surface, when present, has equivalent effect with respect to the various liquids transferred.

Advantageously, the guide 25 may be obtained directly in the manufacture of the capillary reservoir 31, as illustrated in FIG. 4. In fact, when it is completed (see WO 99/55460, corresponding to U.S. Pat. No. 6,350,618), the reservoir 310 is cut transversally toward its entry opening, to provide it with a regular entry face 37. The cut part 250 (FIG. 4), which is called the "chute" or "extra part" can be used advantageously as a guide 25. It should be noted that, on a thickness 27 corresponding to the thickness of the saw stroke, some material is eliminated between the entry face 37 and the scrap 250.

The chute 250, which has the shape of a biscuit traversed by regularly spaced parallel canals 251, is placed on the exit ends 9 of the tubes 3 of the device 1 when said device 1 is made, for example, by force fitting as illustrated in FIG. 2. One advantage of a guide 25 obtained in this way is that each reservoir 310 has its own guide 25 and its own transfer device 1. Because of this, the user can count on optimal spacing between the tubes 3 of the device 1.

In general, when the device 1 includes a guide 25 at one end, said guide 25 is placed between the closest alignment member 17, 19 and the end of the device 1, on the useful portion of the corresponding end 13, 15. Optionally, the first and/or second alignment member 17, 19 also guides the entry ends 5 and/or the exit ends 9 when introduced into the source sub-containers 43 and/or the target sub-containers 33.

In an optional variant, the first means of assembly or alignment member 17, and the second means of assembly or alignment member 19, or the guide or guides 25, if needed, is equipped on the face which faces the source container 41 or the target container 31 when in service, with a spacer 71 (see FIG. 6). The presence of this spacer 71 makes it possible to avoid the risk of contamination of one liquid by another under the effect of the phenomenon of parasite transversal capillarity, which occurs between said means of assembly or alignment member 17, 19 and the corresponding container 31, 41. This spacer 71 can be presented in the form of at least 3 plots in relief, extending to the outside from the relevant face of said means of assembly or alignment, or any other functionally equivalent means. It is preferable for the spacer 71 (or the various parts that comprise it, if applicable) to be placed on the periphery of the relevant face of the means of assembly or alignment member 17, 19.

According to another optional variant (not shown in the Figures), which is particularly well suited when the tubes 3 are made of metal, said tubes 3 present at least one exit end 7, which is beveled. The advantage of such an end is that it allows better penetration of said exit end 7 of the tubes 3 in the corresponding target sub-containers 31.

According to another embodiment of the invention, a process of simultaneous transfer of liquids will be described withreference to FIGS. 5–9, which provide a more detailed illustration of the process of filling a capillary reservoir 310 from a microtitration plate. A device 1 similar to the device shown in FIG. 2 can be used to implement the process according to this embodiment. The exit ends 9 of the tubes 3 are introduced by their useful segments of end 15 into the target sub-containers 33 (canals 330) of target container 31 (reservoir 310), for example, through openings 35 (entry openings 350) of said target sub-containers 33 (canals 330). We then take the entire part formed by the target container (reservoir) 31 and the device 1, and introduce the entry ends 5 of the tubes 3 by their useful portions of end 13 into the source sub-containers (wells) 43 of the source container (microtitration plates) 41 for example through openings 45 of said source sub-containers (wells) 43. It is preferable to use a vertical top-to-bottom movement as indicated by the arrow 50 of FIG. 5. Each course sub-container (well) 43 is filled with a liquid 61, 63, 65, etc. which is a priori different from the liquid contained in the nearby source sub-container 43. The liquids are then partly aspirated by capillarity. FIG. 6 illustrates this stage of the process.

Figure 7:
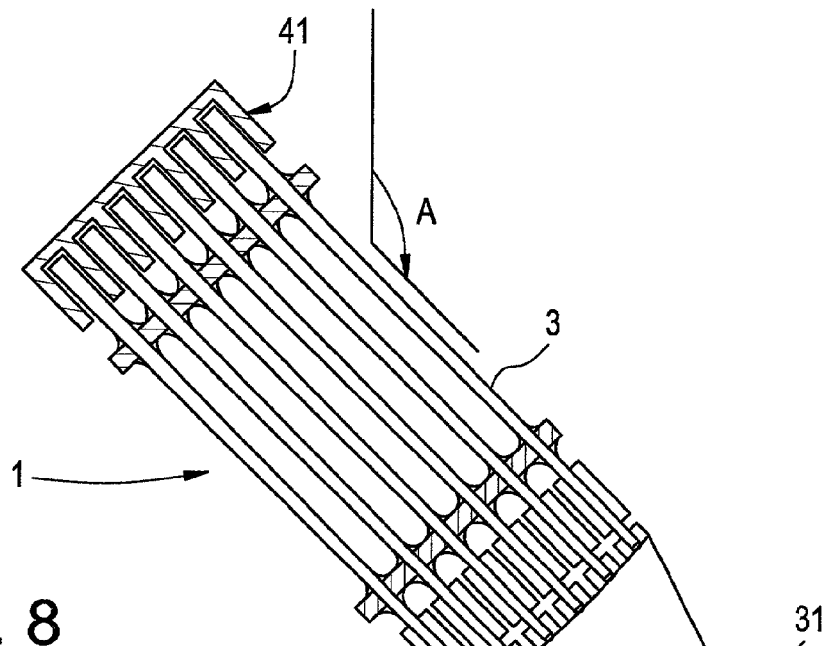

Then the whole assembly formed by the device 1, the source container (microtitration plate) 41 and the target container (reservoir) 31 is inclined progressively to an angle A greater than 90°, as indicated in FIG. 7. Subsequently, all the liquid is in the tubes 3. It is preferable for the angle A to be between 90° and 150°, and more preferable for it to be between 100° and 135°.

Because of a gradual and therefore sufficiently slow incline, the liquids contained in the source sub-containers 43 flow into the tubes 3 through their entry openings 7 under the combined effect of the forces of capillarity and gravity, rather than outside of said tubes 3 under the effect of gravity alone. It is preferable for the whole to be inclined at a rate of 5° to 15° per second, and more preferable at a rate of about 10° per second.

The process according to certain embodiments of the invention then includes a stage of withdrawal of the source container 41, once the liquids have been completely transferred from the source sub-containers 43 into the tubes 3. It then comprises a stage of withdrawal or separation of the target container 31, once the liquids have been completely transferred from the tubes 3 into the target sub-containers 33.

One advantage of the guide 25 obtained as illustrated in FIG. 4 appears in the first stage of filling of the capillary reservoir 31. The exit ends 9 of the tubes 3 of the device 1 are introduced by their useful portions of end 15 into the target sub-containers or canals 33 of the target container or reservoir 31 to a final position. This final position corresponds to a natural abutment due to the corresponding dimensions of the canals 33 of the reservoir 31 and the canals 251 of the chute 250. In this final position, the chute 250 faces the entry face 37 of the reservoir 31. However, said chute 250 does not come into contact with said entry face 37, and they are separated by a distance essentially equal to the thickness 27 of the saw stroke. The distance created in this way constitutes a means of separation 71 which advantageously allows for preventing contamination of liquids between the various canals 330 of the reservoir 31.

Figure 8:
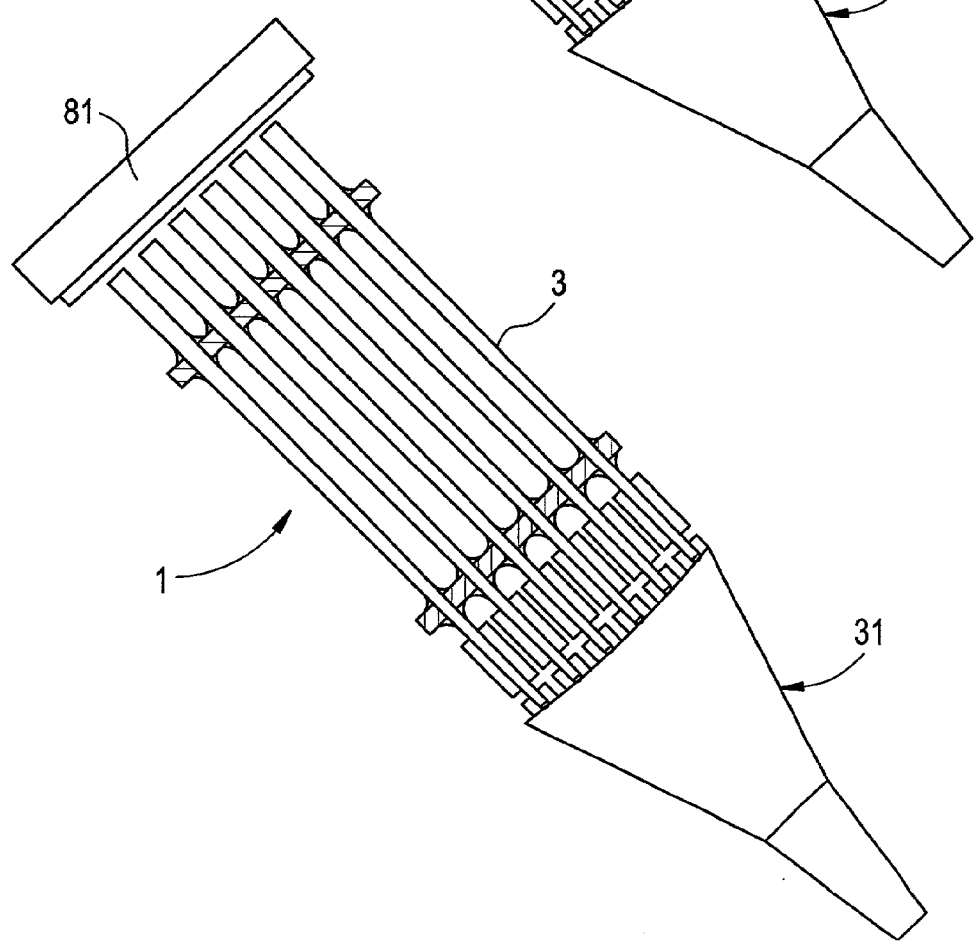
FIG. 8 illustrates an additional optional phase of the process of the invention.

FIG. 8 illustrates an optional stage of the process of the invention which is particularly advantageous when the volumes of liquids transferred are very small, i.e. about 10 microliters or less. In this case, the liquids may not be completely transferred form the source sub-containers 43 to the target sub-containers 33, and some residue of liquid remains in the source sub-containers 43. The optional stage of the process consists of applying a means 81 to force the final flow of the liquids into the tubes 3 of their entry opening 7 to their exit opening 11, then to the target sub-containers 33, once the source container 41 has been withdrawn.

Advantageously, this means 81 to force the flow of liquids may be a buffer or a silicone plate, applied hermetically to the entry openings 5 of the tubes 3. This buffer and/or this silicone plate 81 is heated to at least 50° C. to expand the volume of air inside the tubes 3 to their entry opening 5, which forces the liquids to the exit ends 9 of said tubes 3.

Figure 9:
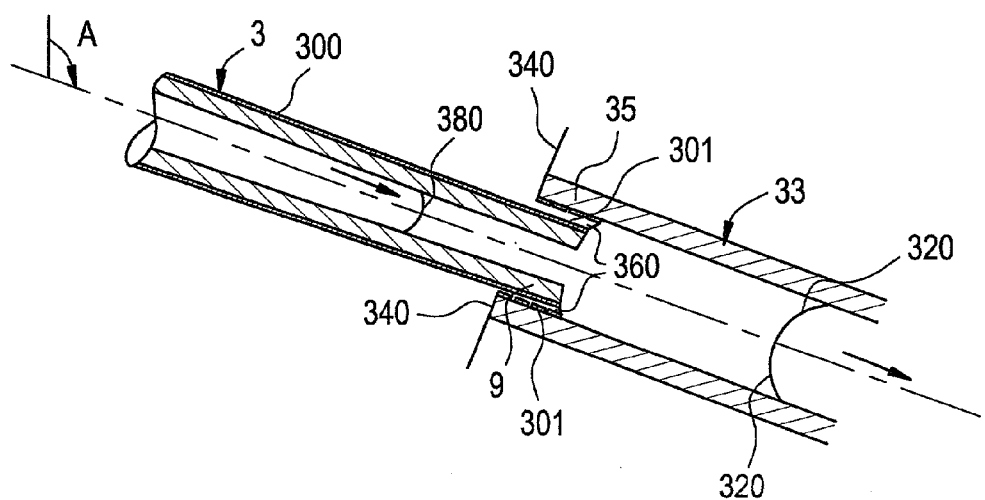
FIG. 9 illustrates, in longitudinal section, the transfer of liquid from one tube of the device into a target sub-container when the external surface of the tube is coated with a surface treatment.

FIG. 9 shows an enlarged view of the passage of the liquid from a tube 3 to a target sub-container 33 having an essentially tubular opening 35, when the exit end 9 of the tube 3 has dimensions slightly smaller than those of the opening 35 of the target sub-container 33. The volume of liquid that is transferred is between an upstream meniscus 320 of the sub-container 33 and a downstream meniscus 380 of the tube 3. When the tube 3 is introduced into the opening 35 of the sub-container 33, the external surface 300 of the tube 3 and the internal surface 301 of the opening 35 can be put into contact. There is then some risk that a fraction of liquid will slide into the resulting space 360, and that it will then return as far as face 340 of the sub-container 33. There may then be a risk of contamination of the nearby sub-containers by the flow of said liquid fraction along said face 340 when it is inclined. Advantageously, the external surface 300 of the tube 3 is subjected, at least toward its exit end 9, to a surface treatment designed to make it impervious to the transferred liquids. This treatment may be, for example, a coating based on fluorinated polymers.

Without intending to limit the invention in any manner, the present invention will be more fully described by the following examples.

EXAMPLE

A volume of 3–12 microliters of liquids made up of biological molecules in solution in a solvent, said solvent being, for example, a mixture of ethylene glycol and water or a solvent such as DMSO (dimethylsulfoxide) were introduced into the canals of a capillary reservoir. The liquid is sampled in a standard microtitration plate, e.g. a plate 1536 sold under the brand name Costar®. This microtitration plate contains 48×32 wells, each well being separated from the others by a distance of 2.25 mm measured between their longitudinal axes.

For this purpose, a device 1 having tubes 3 made of stainless steel and having an essentially conical form was used. The tubes 3 are 160 mm long. Their entry openings have an internal diameter of 1.3 mm and an external diameter of 1.5 mm. Their exit openings have an internal diameter of 0.4 mm and an external diameter of 0.6 mm. The device 1 comprises 2 means of alignment. The first maintains a distance of 2.25 mm between the axes of the tubes 3 and their entry openings.

The chute or extra part of the capillary reservoir was used as the guide; the reservoir was filled by this device 1. The thickness of the saw stroke at the cut separating the chute and the reservoir was 1 mm. The distance measured between the longitudinal axes of the 2 canals near said chute was 1.1 mm. The exit ends of the tubes 3 were introduced into the canals of said chute at a frequency of 1 tube per 2 canals, for example.

Of course, the invention is not limited to the preferred mode of embodiment described; it can be adapted to all variations, particularly variations in shape and/or size, which will be apparent to a person skilled in the art. For example, a device whose tubes have larger entry openings than exit openings has been described, but it would also be possible to design a device with tubes having entry openings the same size as, or smaller than, the exit openings. In addition, although the embodiments described herein include a linear matrix structure, it is possible to design any other arrangement of the tubes 3 compatible with the disposition of the source sub-containers and the target sub-containers, respectively, such as a compact hexagonal matrix structure.

The device and the process that have been described may be valuable in applications other than those used to illustrate the invention, for example in combination chemistry, and in general whenever there is a need to transfer liquids simultaneously form a multitude of source sub-containers to a multitude of target sub-containers. It will be apparent to those skilled in the art that various modifications and variations can be made to the present invention without departing from the spirit or scope of the invention. Thus, it is intended that the present invention cover modifications and variations of this invention provided they come within the scope of the appended claims and their equivalents.

What is claimed is:

1. A process of simultaneous transfer of liquids from a source container to a target container comprising:

providing a device including a multitude of tubes arranged in a matrix, each tube having an entry opening at an entry end and an exit opening at an exit end and at least one alignment member to maintain the pre-determined distances between the entry ends of the tubes and to maintain pre-determined distances between the exit ends of the tubes, wherein each of said tubes being capable of holding fluid by a phenomenon of capillarity, wherein the source container includes a multitude of source sub-containers the target container includes a multitude of target sub-containers, and wherein said matrix is vertically arranged with said exit openings directed upward and in fluid communication with said target container and said entry openings are directed downward and in fluid communication with said source container;

introducing the exit ends of the tubes into the target sub-containers;

introducing the entry ends of the tubes into the source sub-containers in an essentially vertical direction; and progressively inclining the source container to an angle greater than 90°, thereby transferring said liquid from said source container through the tubes to said target container.

2. The process according to claim 1, wherein the source container is a microtitration plate and the multitude of source sub-containers are wells; wherein the target container is a capillary reservoir and the target sub-containers are canals; and the process of filling the capillary reservoir from the microtitration plate includes:

introducing the exit ends of the tubes into the entry openings of the canals;

introducing the entry ends of the tubes into the wells in an essentially vertical direction; and inclining the device, the reservoir, and the microtitration plate to an angle greater than 90°.

3. The process according to claim 2, wherein the angle of incline of the device is between 90° and 150°.

4. The process according to claim 2, wherein the angle of incline of the device is between 110° and 135°.

5. The process according to claim 2, further including withdrawing the source container and withdrawing the target container from the device.

6. The process according to claim 5, further including forcing the flow of the liquids into the tubes after the source container has been withdrawn.

7. The process according to claim 6, wherein forcing the flow includes applying a silicone buffer which is heated to more than 50° C. to the entry openings of the tubes.

* * * * *